United States Patent [19]
Sartorio et al.

[11] Patent Number: 5,149,072
[45] Date of Patent: Sep. 22, 1992

[54] SHEET WORKPIECE POSITIONING DEVICE

[75] Inventors: Franco Sartorio; Mario Scavino, both of Turin, Italy

[73] Assignee: Amada Company, Limited, Japan

[21] Appl. No.: 451,081

[22] Filed: Dec. 15, 1989

[30] Foreign Application Priority Data

Dec. 16, 1988 [IT] Italy ............... 68116 A/88

[51] Int. Cl.⁵ .................................. B25B 1/24
[52] U.S. Cl. ................... 269/111; 269/152; 269/234; 269/254 R
[58] Field of Search ............ 269/234, 152–155, 269/45, 56, 254 R, 111

[56] References Cited

U.S. PATENT DOCUMENTS

| | | | |
|---|---|---|---|
| 1,583,967 | 5/1926 | Epps | 269/234 |
| 2,991,669 | 7/1961 | Stock | 269/45 |
| 3,758,099 | 9/1973 | Scott | 269/234 |
| 4,254,446 | 3/1981 | Kerr et al. | 269/152 |
| 4,523,749 | 6/1985 | Kindgren et al. | 269/234 |
| 4,693,458 | 9/1987 | Lewecke et al. | 269/329 |

Primary Examiner—Robert C. Watson
Attorney, Agent, or Firm—Wigman & Cohen

[57] ABSTRACT

The sheet workpiece positioning device (10) is designed for supporting a sheet workpiece (5) along three adjacent sides thereof, by means of opposing supporting members (12 and 14) and a supporting member (13) set at right angles to the former supporting member. Preferably, at least one of the former supporting member (12 and 14) is designed to be able to slide along the latter supporting member (13). The sheet workpiece is gripped by a plurality of independent gripping devices (19, 119 and 20), evenly spaced out, side by side, and held, respectively, by the supporting members (12, 13 and 14). The gripping devices, which are long and thin, comprise a gib (39) and a front edge (45) of a U-shaped elastic member (46). An upper prong (48) of the U-shaped elastic member, interacts with an angle plate (53) held fixed by the gib and set so as to move the second gripper jaw provided on the upper prong towards the first gripping jaw (45) of the gib (39), following the traction of the U-shaped elastic members (46).

13 Claims, 4 Drawing Sheets

SHEET WORKPIECE POSITIONING DEVICE

BACKGROUND OF THE INVENTION

1. Field of the Invention

The present invention relates to a sheet workpiece position device specifically designed for moving, at high speeds, of various sizes to serve fixed heads for hemming and/or cutting the sheet workpiece.

2. Description of the prior art

For the hemming and cutting of the sheet workpiece, use is made both of mechanical machine tools (hemming machines, nibbling machines) and thermal machine tools (based on plasma-arc cutting, laser cutting.

In processing a sheet workpiece along a cutting trajectory, in many cases, it is more advantageous to move the metal sheet workpiece with respect to a tool carrier head of the machine tool rather than to move the tool-carrier head of the machine tool with respect to the sheet workpiece fixed at standstill on a frame of the machine tool. This operation of positioning of the sheet workpiece with respect to the tool-carrier head is normally performed by gripping the sheet workpiece to be machined (usually rectangular in shape and of any size within the maximum trade formats) by means of a set of pliers. That is to say, the set of pliers grip the sheet firmly along one side and move it close to the machining head in a vertical position in machine tools with vertical or subvertical feed. In the machine tools with horizontal feed, the pliers move the workpiece close to the machining head on a roller table set around the head to prevent excessive bending of the sheet workpiece.

Although this method has been extremely useful in the past, now, because of the increase in the speed and acceleration of the movements currently set on handling devices, thanks to the progress made in electronic controller systems and in the design of servomechanisms, it is no longer practicable. That is to say, when this type of gripping technique is used, particularly on a thin sheet workpiece, it is difficult to control the condition of the workpiece, which, at high speeds, tends to split and "fly off", in the areas on the opposite side to the gripped side and along the lateral edges.

In addition, the pliers constituting gripping devices currently in use have a frame with opposing lever fulcrums, in which one of the jaws is fixed and the other is hinged to it and driven by a pneumatic (or hydraulic) actuator which produces the rotation required to open or close the jaws. This frame is rather bulky and, if relatively long jaws are required, it is extremely unreliable as its rigidity is considerably reduced. Further, this frame does not provide a great gripping strength and thus leads to reduced specific pressures on the sheet workpiece, so that the sheet workpiece handled (stainless steel, shot-blasted, prepainted, etc.) may come off from the griping devices to be severely damaged.

SUMMARY OF THE INVENTION

With these problem in mind, it is the primary object of the present invention to provide a sheet workpiece positioning device, capable of moving a sheet workpiece at high speed, without casing the workpiece to tend to splict and "fly off" in the areas on the opposite side to the gripped side and along the lateral edge. A fast movement is considered, here and in the description that follows, to be any movement performed at a speed in the order of 1 m/sec with accelerations in the order of 10 m/sec.

It is another object of the present invention to provide a sheet workpiece gripping device which is mounted on a sheet workpiece positioning device, capable of gripping sheet workpiece of various sizes firmly, one at a time, without the risk of undesired deformation of the workpieces during any fast movements performed on the workpiece.

To achieve the above-mentioned first object, a sheet workpiece positioning device of the present invention comprises a frame (26); a first supporting member (13) mounted on the frame, extending in a first direction and free to move in two directions within a plane parallel to the first direction; a first sheet workpiece gripping device (20) supported on the first supporting member, for gripping the sheet workpiece; a second supporting member (12) mounted on the first supporting member, extending in a second direction in the plane; and a second sheet workpiece gripping device (19) supported on the second supporting member, for gripping the sheet workpiece from a direction differing from a direction from which the first gripping device grips the sheet workpiece.

To achieve the above-mentioned second object, a sheet workpiece gripping device mounted on a supporting member of a sheet workpiece positioning device comprises a first jaw mounted on the supporting member, projecting therefrom; a second jaw mounted on the supporting member, projecting therefrom and free to move in its projection direction; means for biasing the second jaw toward the first jaw when the second jaw is moved toward the supporting member and; means for moving the second jaw toward the supporting member.

BRIEF DESCRIPTION OF THE DRAWINGS

The invention will be described by way of example with reference to the accompanying drawings, in which.

DESCRIPTION OF THE PREFERRED EMBODIMENT

Figure 1:
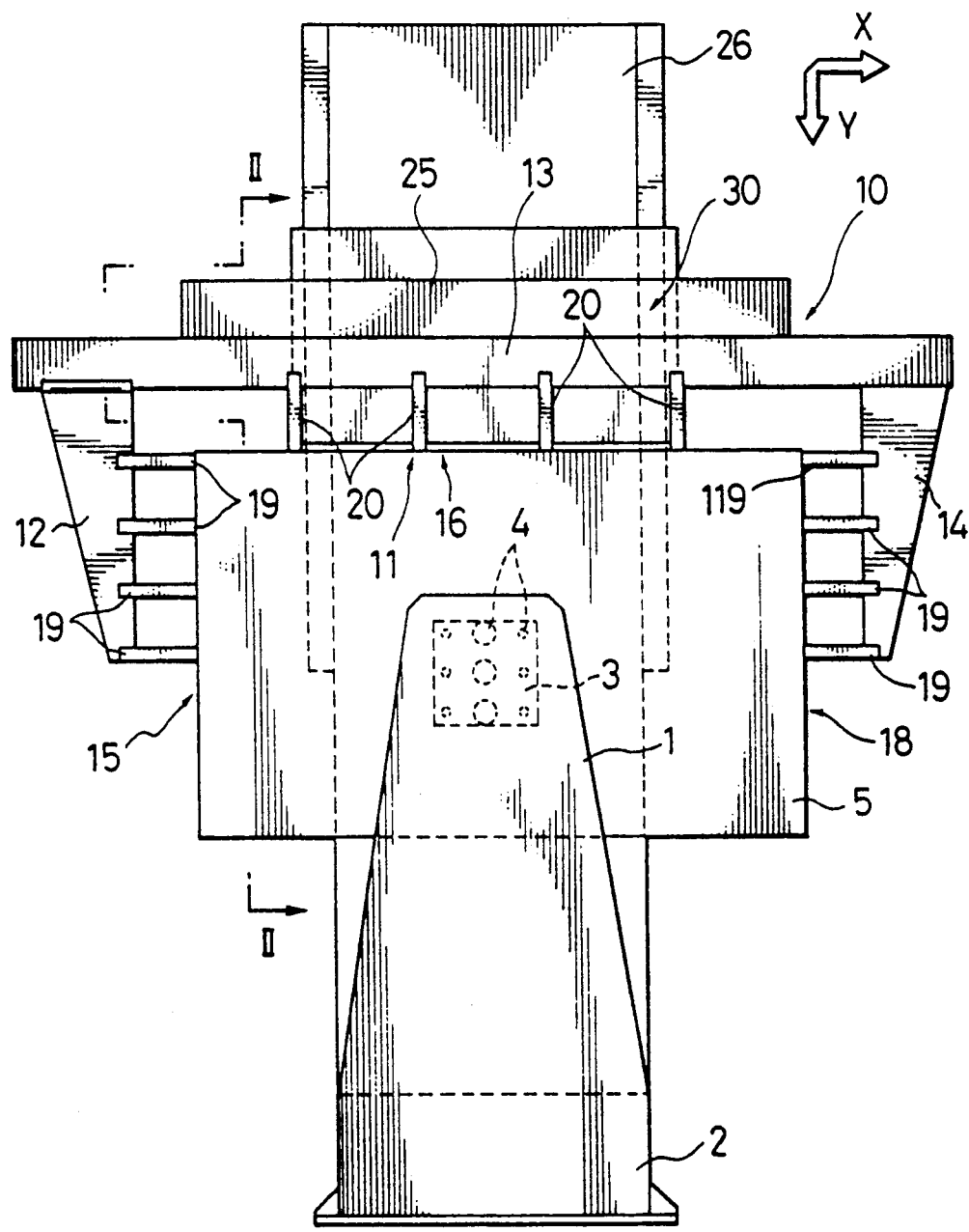
FIG. 1 is a front view showing an embodiment of sheet workpiece positioning device in accordance with the invention.
Figure 2:
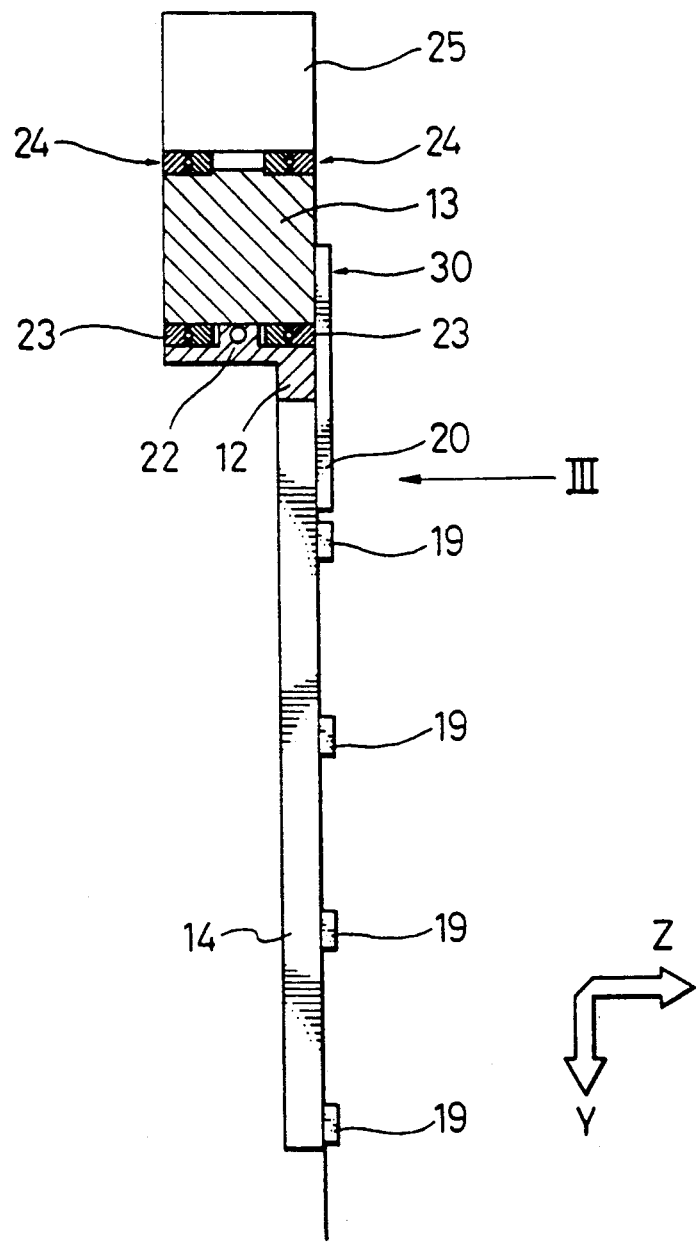
FIG. 2 is an enlarged sectional view, taken along a line II—II, of the device shown in FIG. 1.

In reference to FIGS. 1 and 2, the numeral 1 is used to indicate a known hemming and/or cutting head of a known machine tool indicated by the numeral 2. The machine tool is illustrated only in part for the sake of simplicity. In the present case, a head 1 is a hemming head of a machine tool of a vertical type, and comprises an interchangeable prismatic receptacle 3 (which, in an alternative embodiment could be replaced by a revolving turret) containing a series of punches 4. The punch 4 is adapted to machine, on the basis of a known principle, a rectangular sheet 5 of any size, held firmly, in accordance with an embodiment of the invention by a sheet workpiece positioning device 10. The sheet workpiece positioning device 10 may be translated with respect to head 1, at a high speed and close to the head, for example, by means of a known robot-controlled handling device (not shown) in at least a horizontal direction and a vertical direction, each indicated by the arrows X of Y in FIG. 1. If desired, the sheet workpiece positioning device 10 may be designed to be translated in a horizontal direction X and in a subvertical direction Y slightly tilted from the vertical direction. Also, the machine tool 2 may be of a horizontal feed type; in the case of the horizontal feed type machine, the sheet workpiece positioning device 10 translates, in the horizontal directions X and Y, workpiece 5 on a roller feed table of a known type (not shown) set around machining head 1.

Referring again to FIG. 1, the sheet workpiece positioning device 10 comprises mechanical gripping means 11, held by supporting members 12, 13 and 14 set in pairs at rights angles to each other. The sheet workpiece gripping device 11 is adapted to grips workpiece 5 simultaneously along three adjacent sides 15, 16 and 18 of the workpiece 5. In a preferred embodiment of the invention set forth above, the gripping means 11 comprises a plurality of relatively long and thin independent gripping devices, i.e. a first gripping devices 20, second gripping devices 19 and the third gripping device 119. The gripping devices are held side by side and evenly spaced out by supporting members 12, 13 and 14. In particular, a second and a third gripping devices 19, 119 are equally distributed on a second and a third supporting members 12, 14 set opposite and parallel to each other. The first gripping device 20 are on the other hand held by the first supporting member 13 which extends in the X-axis direction for supporting the second and the third supporting members 12 and 14. The first supporting member 13 is set at right angles to the second and the third supporting members 12, 14; i.e. supporting members 12 and 14 project from the first supporting member 13 along the axis parallel to sides 15, 18 of the workpiece 5. The first gripping devices 20, apart from the fact that they are held by the first supporting member 13, are identical to the second and the third gripping devices 19, 119.

In order that the sheet workpiece positioning device 10 may support workpieces of various different sizes, the second supporting member 12 (or both the second and the third supporting members 12 and 14) is mounted on the first supporting member 13 in a manner such that it slides traversely therealong in the X-axis direction. The sheet workpiece positioning device 10 also comprises suitable motorized means for translating the second supporting members 12 along the first supporting member 13. These motorized means may comprise a linear actuator 22, of the nut-and-bolt type driven by a motor of a known type (not shown) held by the supporting member 13, as shown in FIG. 2.

Figure 3:
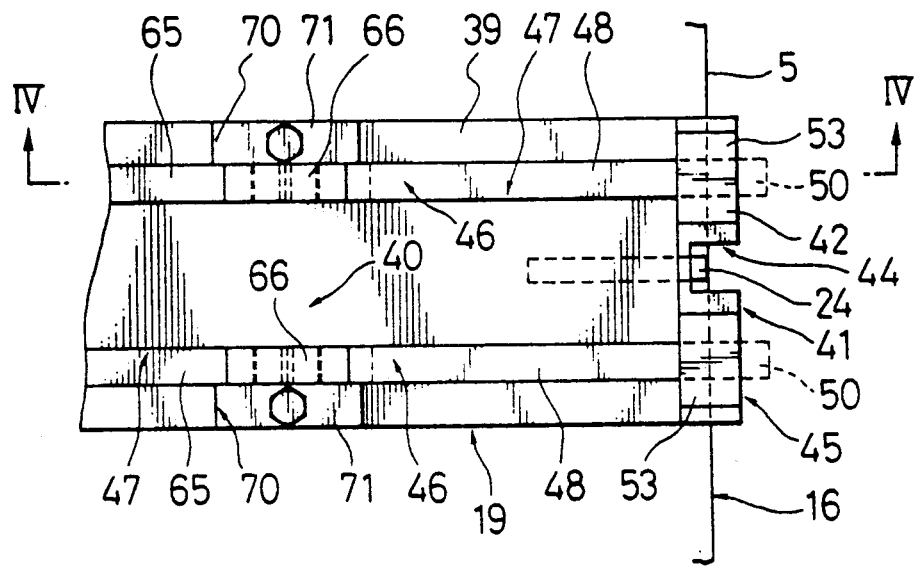
FIG. 3 is an enlarged sectional view from direction IV (indicated by an arrow in FIG. 2) of a sheet workpiece gripping device mounted on the sheet workpiece positioning device shown in FIGS. 1 and 2.
Figure 6:
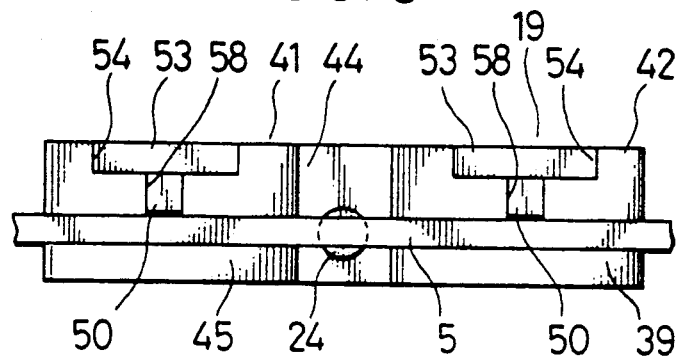
FIGS. 6 and 7 are, respectively, a view from direction VI (indicated by the arrow in FIG. 4) and a perspective and cut-away view of the sheet workpiece gripping device shown in FIG. 3.

The linear actuator 22 is controlled, via a known control unit (not shown) by at least one sensor, such as for example, a proximity detector 24 held at the front of at least one of the second gripping devices 19, as shown in FIGS. 3 and 6.

Referring again to FIG. 2, the actuator 22 is provided at the bottom of the first supporting member 13 and is adapted to translate the second supporting member 12 (or both the second and the third supporting members 12 and 14) along their respective guides 23 of a known type.

In the present embodiment, the first supporting member 13 is supported, free to slide in the X-axis direction along known respective guides 24, by a motorized truck 25. The motorized truck 25 is in turn supported by a vertical slide 26, free to slide in the vertical direction (see FIG. 1). Further, the vertical slide 26 may be held movable in a Z-axis direction perpendicular to the X- and Y-axes directions, enabling to adjust a position in the Z-axis direction of the workpiece 5 with respect to the tools 4. Further, the vertical slide 26 may be held free to rotate about an vertical axis enabling to adjust an orientation of the workpiece 5 with respect to the tools 4. The entire complex formed by these elements may constitute a part of an ever larger complex, with even greater capacities for motion.

Referring again to FIGS. 1 and 2, gripping devices 19, 119, and 20 are respectively held projecting at right angles from the supporting members 12, 14, and from a central section 30 of the first supporting member 13 in a manner such that they are set all on the same plane, substantially coinciding with the plane including the workpiece 5. Specifically, the first gripping device 20 is provided on the first supporting member 13 parallel to the second and the third supporting member 12, 14, and shifted from therefrom in Z-axis direction, so that the first gripping device 20 do not obstruct, in any case, the moving path of the second supporting member 12 in the X-axis direction.

The first, the second, and the third gripping devices 19, 119 and 20 have exactly the same structure, so that a structure of the second gripping device 19 will be only explained in detail hereinafter in reference to FIGS. 3 to 7.

Figure 4:
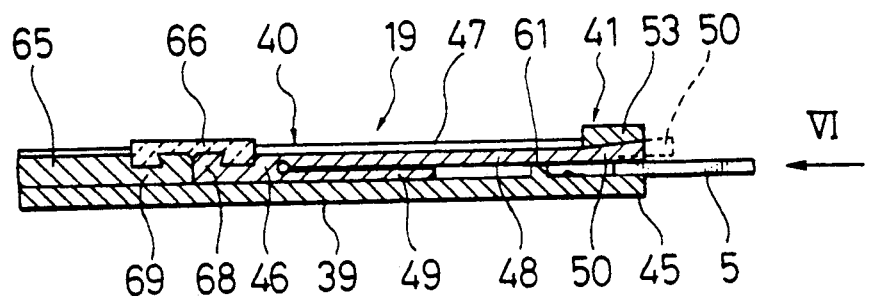
FIGS. 4 and 4 are sectional views, taken along a line IV—IV, of the device shown in FIG. 3, showing, respectively, the complete element and, on an enlarged scale, one of the details of its design.
Figure 7:
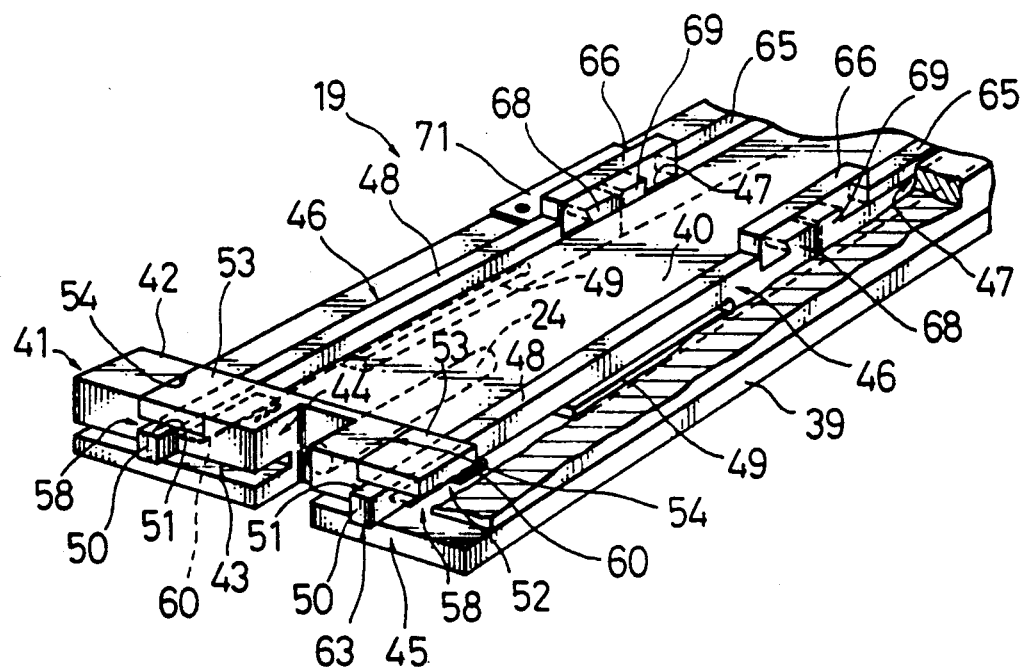

Referring in particular to FIGS. 3 and 7, the second gripping device 19 has a rigid gib 39 which substantially rectangular in shape. The rigid gib 39 has means for attaching it to the second supporting element 12, which may comprise screws or weld beads (not shown). As best shown in FIGS. 4 and 7, the gib 39 is bounded by a flat upper surface 40, and has a free end 41 projecting from the second supporting member 12.

Formed on the free end 41 are a transverse raised step 42 (see FIG. 5) presenting, in turn, a transverse channel 43 and central recess 44 perpendicular to the transverse channel 43. The transverse channel 43 is sufficiently deep to accommodate a side 16 of the workpiece 5 of any thickness (provided that it does not exceed the maximum thickness for sheets used in machining). Bounded by the transverse channel 43 is a lower front edge or a lip 45 of the gib 39. The lower front edge 45 is adapted to act in contact with the workpiece and thus defines a first gripping jaw of the sheet workpiece gripping device 19.

The central recess 44 houses the end of detector 24 with the rest of detector 24 being housed on the gib 39. The detector can thus contact the workpiece 5 as soon as the workpiece 5 is reached by the second gripping device 19 following the translation of the second supporting member 12.

The second sheet workpiece gripping member 19 comprises at least one U-shaped elastic member 46 made, for example, of music wire. The U-shaped elastic member 46 is held free to slide on gib 39 in the longitudinal direction thereof. In this embodiment, in particular, the gib 39 is fitted with a pair of elastic members 46, free to slide along a pair of straight longitudinal grooves 47 formed parallel to each other on the surface 40 of the gib 39.

Each U-shaped element 46 comprises a pair of opposing upper and lower prongs 48 and 49 set slightly apart when the elastic member 46 is idle. The U-shaped elastic member 46 are asymmetrical in that the upper prong 48 of each one is longer than lower prong 49. The U-shaped elastic member 46 is dragged along respective groove 47. The upper prongs 48 have a free end 50 whose thickness gradually increases in a linear manner, giving it a flared longitudinal profile which defines an inclined surface 51 turned towards the opposite side to the first gripping jaw 45.

Figure 5:
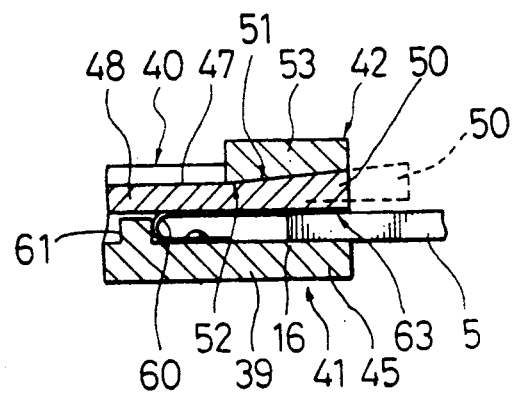

Referring in particular to FIGS. 5, 6 and 7, the transverse raised step 42 formed on the free end of the gib 39 is formed with slots 54 extending in the longitudinal direction of the gib 39. Fitted in the slots 54 are regulation blocks 53. The regulation blocks 53 are formed with inclined surfaces 52 (FIG. 5) on its bottom and on the level with the longitudinal grooves 47.

The inclined surfaces 52 define, together with the first gripping jaw 45, a flared slot 58 (see FIG. 6), into which a free end 50 of each upper prong 48 of the U-shaped member 46 is inserted. The free end of the upper prong 48 defines a second gripping jaw of the sheet workpiece gripping device 19. In the flared slot 58, the second jaw 50 is translated in such a way as to move the upper prongs 48 and the lower prongs 49 of each U-shaped member 46 closer together, following the translation of the U-shaped member 46 on the gib 39 in the longitudinal direction thereof.

In particular, when the gripping device 19 and 20 are idle, the free ends 50 of the upper prongs 48 project from the flared slots 58, in the position indicated by the dashed line in FIGS. 3, 4 and 5 and by the continuous line in FIG. 7, because of the elastic effect of the upper and lower prongs 48 and 49 which tend to remain apart.

When the U-shaped member 46 are translated in a direction which moves the free ends 50 of the upper prongs 48 away from the first gripping jaw 45, the second gripping jaw 50 interacts with the regulation blocks 53 provided on the free end of the gib 39. Then, as a result of the combined action of the two opposing inclined surfaces 51, 52 on the second jaw 50 and the regulation block 53, the second gripping jaw 50 is pressed with force towards the first gripping jaw 45, thus being bent toward the lower prong 49. The upper prong 48 is blocked against the first gripping jaw 45. Consequently, the sheet workpiece 5 may be pressure-looked between the second gripping jaw 50 and the first gripping jaw 45, with a side thereof 16 (see FIG. 5) inserted in the transverse channel 43 (see FIG. 7) formed on the free end of the gib 39.

It should be noted once again that the free end 50 of the upper prongs 48 defining the second gripping jaws of each gripping device member 19, 119 or 20 are adapted to interact with the first gripping jaw 45 defined by the front edge of the gib 39 in order to grip the sheet workpieces 5.

As best shown in FIG. 5, to eliminate any risk of damaging the surface of the sheet workpiece to be gripped, interposed between the upper prong 48 of each U-shaped elastic member 46 and the first gripping jaw 45, there is a leaf spring member 60. The leaf spring member 60 may have, for example, an asymmetrical U shape like the U-shaped member 46. The leaf spring member 60 is held fixed by the gib 39, against and axial check member 61 defined by a protrusion formed at the bottom of each longitudinal groove 47. The axial check member 61 is provided parallel to a front surface of the first gripping jaw 45 and opposite to a lower surface 63 (see FIG. 5) of the upper prong 48 of the U-shaped elastic member 46.

Accordingly, the leaf spring member 60 may interact directly with the side 16 of the sheet workpiece 5, in place of the sliding second gripping jaw 50 formed on the upper prong 48 of the U-shaped elastic member 46, when the upper prong 48 moves forward with respect to the first gripping jaw 45.

As best shown in FIGS. 4 and 7, the U-shaped elastic member 46 are driven by a sliding drive member (a coupling member) 65 defined by bars mounted, free to move along the longitudinal grooves 47, on a base section of the gib 39. The sliding drive member 65 is in turn activated by a known mechanism (not shown) such as, for example, pneumatic or hydraulic actuators held either by the gib 39 or directly by the supporting members 12, 13 and 14, and controlled by the control unit of the sheet workpiece positioning device 10.

Referring again to FIG. 4, the U-shaped elastic member 46 are detachably connected to drive elements 65, for ease of removal, by a bridge clip 66 of a known type. Specifically the bridge clip 46 is engaged to respective opposite adjacent ends 68 and 69 of the U-shaped elastic member 46 and the sliding drive member 65, having a swallow-tailed conformation at the ends thereof. The bridge clip 66 is fastened simultaneously in the swallow-tailed sections through lateral recesses 70 formed on upper and lower sides of the gib 39 in FIG. 3. The U-shaped elastic member 46 and the sliding drive member 65 are secured to be held closed by blocks 71 inserted in the lateral recesses 70.

Thus, in the present embodiment, the U-shaped elastic members 46, are interchangeable, so that they may be quickly replaced to adapt the gripping devices 19, 119 and 20 to the sheet workpieces 5 of varying types and thicknesses.

The present embodiment of the sheet workpiece positioning device operates as follows:

The sheet workpiece positioning device 10 is hold with the gripping devices 19, 119 and 20 normally open, in other words, with the second gripping jaws 50 projecting from the slots 58 of the gibs 39. In a known manner, the sheet workpiece positioning device 10 is moved towards the sheet workpiece 5 to be gripped, feeding upper and right sides 16 and 18 of the sheet workpiece 5 in FIG. 1 into the transverse channels 43 of the gib 39 of the first and the third sheet workpiece gripping devices 20 and 119. Then, the second supporting member 12 is moved along the first supporting member 13 so that the left side 15 of the sheet workpiece 5 in FIG. 1 is fed into the transverse channel 43 of the gib 39 of the second gripping device 19 held by the second supporting arm 12.

Then the first, the second, and the third gripping devices 19, 119 and 20 are locked, drawing the sliding drive members 65 so that the U-shaped elastic members 46 are moved backwards with respect to the first gripping jaw 45 of each gib 39, together with these members 46, the second gripping jaw 50 are moved back into the slots 58 of the gibs 39. Thus, the upper prongs 48 are bent, interposing the fixed protective springs member 60 between the upper prongs 48 and the sheet workpiece 5, a bottom surface of the workpiece being in contact with the first gripping jaw 45.

At this point, the sheet workpiece 5 is securely gripped along three of its four sides, and may therefore be moved at high speeds without any risk of deforming the sheet workpiece 5, as deformations are prevented by the rigidity of the supporting members 12, 13 and 14 in their respective planes defined by directions X, Y and Y, Z.

In order to machine the sheet workpiece 5 using the punches 4 of the sheet workpiece processing machine 2, the sheet workpiece positioning device 10 will have to be moved below the head 1 of the processing machine 2, in particular on a level of the first, the second, and the third supporting members 12, 13 and 14. In the present embodiment, the sheet workpiece positioning device 10 and the head 1 of the processing machine 2 are prevented from obstructing each other by the fact that the workpiece 5 is held by the gripping devices 19, 119 and 20 which are suitably long and project from the larger supporting members 12, 13 and 14.

Further, in the present embodiment, the gripping devices 19, 119 and 20 are thanks to their structure set forth above, capable to present considerable rigidity and a great gripping capacity, despite their considerable length and reduced thickness. This is because the gripping devices 19, 119 and 20 are secured by the tractions of the sliding drive members 65, so that each gripping devices 19, 119 and 20, for as long as it is held in position, is subjected to an axial traction stress on the U-shaped elastic member 46 and a compressive stress on the gib 39. Those stresses combine to keep the gripping devices 19, 119, 20 rigid.

When the machining process is over, the sheet workpiece 5 is freed simply by pushing the sliding drive member 65, by means of the actuators, forward with respect to the first gripping jaw 45, so that the second gripping jaw 50 move out of the slots 58 of the gib 39. The U-shaped elastic member 46 may be removed, if necessary, by removing the blocks 71 and the clips 66, and simply sliding the U-shaped elastic member 46 up out of the longitudinal grooves 47.

What is claimed is:

1. A sheet workpiece gripping device mounted on a supporting member of a workpiece positioning device for positioning a sheet workpiece with respect to a processing position of a sheet workpiece processing machine, comprising:
   a first jaw mounted on the supporting member, projecting therefrom;
   a second jaw mounted on the supporting member, projecting therefrom and free to move in its projection direction;
   means for biasing the second jaw toward the first jaw when the second jaw is moved toward the supporting member, said biasing means comprising a flared surface section formed on a rear surface of the second jaw, and a regulating block mounted on the first jaw, contacting the flared surface section of the second jaw;
   means, provided in the supporting member, for moving the second jaw toward the supporting member;
   a coupling member coupled to the second jaw moving means and detachably coupled to the second jaw; and
   a U-shaped elastic member formed with a pair of prongs having different lengths, wherein the second jaw is provided on the free end of the longer prong.

2. The sheet workpiece gripping device of claim 1 further comprising a protection member mounted between the first jaw and the second jaw, for protecting the sheet workpiece gripped between the first and the second jaws.

3. A sheet workpiece positioning device provided on a sheet workpiece processing machine for positioning a rectangular workpiece of a normal shape at a required processing position of a sheet workpiece processing machine, said sheet workpiece positioning device comprising:
   a frame fixed on the processing machine;
   a first supporting member mounted on the frame, extending to a first direction and free to move in two directions in a plane parallel to the first direction;
   a first sheet workpiece gripping supported on the first supporting member, for gripping the workpiece at a first side thereof;
   a second supporting member mounted on the first supporting member, extending to a second direction perpendicular to the first direction; and
   a second sheet workpiece gripping device supported on the second supporting member, for gripping the workpiece at a second side thereof, abutting the first side;
   each said gripping device including elastic means for inducing a traction stress along a longitudinal axis of said gripping device and means for inducing a compressive stress normal to the sheet workpiece, said traction stress and said compressive stress combining to make said gripping device rigid while engaged with the workpiece.

4. The sheet workpiece positioning device of claim 3, further comprising:
   a third supporting member mounted on the first supporting member, extending to the second direction in parallel with the second supporting member; and
   a third sheet workpiece gripping device, said gripping device including elastic means for inducing a traction stress along as longitudinal axis of said gripping device and means for inducing a compressive stress normal to the sheet workpiece, said traction stress and said compressive stress combining to make said gripping device rigid while engaged with the workpiece, supported on the third supporting member, for gripping the workpiece at a third side thereof opposite to the second side, wherein, at least one of the second and third supporting members is movable along the first direction so as to grip three sides of the workpiece respectively in response to the dimensions thereof.

5. A sheet workpiece positioning device of claim 3, wherein the plane defined by the first and second supporting members is vertical.

6. A sheet workpiece positioning device of claim 4, wherein the plane defined by the first and second supporting members is vertical.

7. A sheet workpiece positioning device of claim 3, wherein at least one of the first, second or third sheet workpiece gripping device includes:
   a first jaw projecting from either of the supporting members;
   a second jaw projecting together with the first jaw with a space therebetween, and being free to move to the projecting direction, said second jaw being formed with a portion having an inclined surface; and a regulating block provided on the supporting member and engageable with the inclined surface portion for moving the second jaw toward the first jaw when the second jaw is moved toward the supporting member.

8. A sheet workpiece positioning device of claim 4, wherein at least one of the first, second and third sheet workpiece gripping device including:
   a first jaw projecting from either of the supporting members;
   a second jaw projecting together with the first jaw with a space therebetween, and being free to move in the projecting direction, said second jaw being formed with a portion having an inclined surface; and
   a regulating block provided on the supporting member and engageable with the inclined surface portion for moving the second jaw toward the first jaw when the second jaw is moved toward the supporting member.

9. The sheet workpiece positioning device of claim 3, further comprising a proximity switch for detecting the presence of the workpiece.

10. The sheet workpiece positioning device of claim 4, further comprising a proximity switch for detecting the presence of the workpiece.

11. The sheet workpiece positioning device of claim 5, further comprising a proximity switch for detecting the presence of the workpiece.

12. A sheet workpiece gripping device on a workpiece positioning device of a sheet workpiece processing machine, comprising:
   a first jaw projecting from the positioning device in a projecting direction;
   a second jaw projecting together with the first jaw with a space therebetween, and being free to move in the projecting direction, said second jaw being formed with a portion having an inclined surface; and
   a regulating block provided on the positioning device and being engageable with the inclined surface portion for moving the second jaw toward the first jaw when the second jaw is moved in the projecting direction toward the positioning device;
   said gripping device including elastic means for inducing a traction stress along a longitudinal axis of said gripping device and means for inducing a compressive stress normal to the sheet workpiece, said traction stress and said compressive stress combining to make said gripping device rigid while engaged with the workpiece.

13. The sheet workpiece gripping device of claim 12, wherein the second jaw is replaceable in response to the thickness of the sheet workpiece.

* * * * *